United States Patent [19]
Spurgeon et al.

[11] Patent Number: 5,608,986
[45] Date of Patent: Mar. 11, 1997

[54] TROLLING WEIGHT FOR DOWNRIGGER TYPE FISHING SYSTEMS

[75] Inventors: Cecil R. Spurgeon, Richmond; Arthur H. Barnes, Sebastopol, both of Calif.

[73] Assignee: Joe/Art, Inc., Sebastopol, Calif.

[21] Appl. No.: 549,248

[22] Filed: Oct. 27, 1995

[51] Int. Cl.$^6$ ............ A01K 91/08; A01K 95/00
[52] U.S. Cl. ............................ 43/43.13; D22/145
[58] Field of Search ............ 43/43.12, 43.13, 43/44.96, 44.97, 43.1, 27.4; D22/145

[56] References Cited

U.S. PATENT DOCUMENTS

| | | | |
|---|---|---|---|
| 2,470,995 | 5/1949 | Lesser | 43/44.92 |
| 3,797,159 | 3/1974 | Reith | 43/43.12 |
| 4,028,837 | 6/1977 | Clark | 43/43.12 |
| 4,255,890 | 3/1981 | Smith | 43/43.12 |
| 4,430,823 | 2/1984 | Henze et al. | 43/43.12 |
| 4,546,567 | 10/1985 | Bailey | 43/44.89 |
| 4,907,347 | 3/1990 | Pease | 43/27.4 |
| 4,945,669 | 8/1990 | Webel | 43/42.39 |

FOREIGN PATENT DOCUMENTS

| | | | |
|---|---|---|---|
| 2207841 | 2/1989 | United Kingdom | 43/44.81 |

OTHER PUBLICATIONS

Catalog advertisement entitled "Downrigger Accessories", *Scotty Fishing & Marine Products*, 1994.

Catalog advertisement sheet entitled "BigJon", *Cabela's Fishing, Hunting and Outdoor Gear*, Spring 1995.

Catalog advertisement sheet, see "Finned Weights", *Offshore Angler*, 1995.

*Primary Examiner*—J. Elpel
*Attorney, Agent, or Firm*—Townsend and Townsend and Crew; Henry K. Woodward

[57] ABSTRACT

A trolling weight used in conjunction with downrigger type fishing systems that is very stable and tracks straight at trolling speeds up to and greater than eight miles per hour. The weight is easily attached to any trolling cable using a variety of commercially available trolling cable attachment clips or by connecting the trolling cable directly to the trolling cable attachment eye of the trolling weight. The trolling weight varies in size ranging from two to sixty pounds with a broad selection of colors. The trolling weight is produced of materials considered to be environmentally safe to use in fisheries, unlike the lead weights now available. They are coated with a polyester powder coating and cured at approximately 400 degrees fahrenheit to produce a hard abrasion resistive surface. The trolling weight's unique design is highly resistant to fouling when contacting underwater objects. Its fin is designed in that a handle is formed thereby providing a method by which the weight can be easily grasp for carrying and holding; therefore, reducing personal injury and equipment damage as a result of dropping. The trolling weight is of a single embodiment.

6 Claims, 3 Drawing Sheets

TROLLING WEIGHT FOR DOWNRIGGER TYPE FISHING SYSTEMS

BACKGROUND

1. Field of Invention

This invention relates to a device used to carry a trolling cable to great depths for fishing with line release systems, such as downriggers.

2. Description of Prior Art

The present invention relates to devices commonly referred to as "Trolling Weights" which are used in conjunction with downrigger types of fishing equipment. A downrigger system is used for trolling a fishing bait or artificial lure from a moving boat to most any desired fishing depth. These devices permit one or more fishing lines to be held by and released from a weighted cable at depths unattainable otherwise. When a fish strike is applied to the bait end of a fishing line, a release mechanism frees the fishing line allowing a fish to be played without the presence of a heavy weight. Although downrigger equipment varies in design, generally it consist of: a heavily constructed reel, a boom and a pulley that is attached to some part of the upper structure of a boat. This reel contains several hundred feet of stainless steel cable that is used to lower a heavy weight (3 to 60 pounds), to which a fishing line is attached, to a selected depth. The size and shape of a weight will determine a maximum depth that can be reached.

The shape of a weight will determine the stability in which a trolling cable tracks. An unstable weight does not track straight when being pulled through the water and prevents the use of more than one trolling system at a time. Weights that oscillate back-and-forth under the water as they are being trolled can cross and become tangled. The shape, size and stability of a trolling weight affects the depth that a downrigger system can satisfactorily perform. As the speed and the depth of a trolling weight changes, the water forces imposed on its surface increases therein causing the trolling weight to rise therein limiting the effective trolling depth that can achieved. Therefore, the shape of a trolling weight must be of a design which minimizes the water drag if maximum weight efficiency is achieved.

Large, heavy, round or cylinder shaped trolling weights are difficult to grasp when trying to carry, or attach/remove from a downrigger trolling cable. Because of their shape and weight they are easily dropped in the water and lost. A hand or foot can even be broken, if struck be a large trolling weight.

Trolling weights currently available in the market place have several disadvantages:

a) They are unstable and must be trolled at speeds less than three miles per hour.

b) They are made of toxic materials (LEAD), determined to be environmentally unsafe.

c) Their shape makes them difficult to handle.

d) A process used to coat many weights for safe handling causes environmental pollution problems.

e) The shape of some trolling weights require that they be placed in a containment vessel, otherwise they roll uncontrolled in a boat and become a danger to the boat and it occupants.

f) Weights are easily dropped causing injury, or damage.

g) Weights do not track straight and foul fishing lines and downrigger cables.

h) The design of many trolling weights limit their size to four pounds or less.

i) The design of their trolling cable attachment limits the ease in which they can be attached or removed from a downrigger trolling cable.

A patent search revealed only three weights that demonstrated their use as downrigger trolling weights and each trolling weight possesses several disadvantages:

One weight that exhibits several of the disadvantages noted, is disclosed within the U.S. Pat. No. 4,028,837 (1977) issued to Norman E. Clark. Clark's weight is combined with a line release device as one unit. The weight section is of a cylinder shape having a fin suspending from the bottom. Since Clark's weight is a part of his release, it would be of little use as a weight on its own merits.

Another such patent was issued to Bert A. Smith under U.S. Pat. No. 4,255,890 (1981). It too is combined with a release and it's function as just a trolling weight would be limited to very slow speeds, trolling depths less than 100 feet and trolling stability.

Walter J. Henze and William A. Purcell U.S. Pat. No. 4,430,823 (1984) again combines a line release attachment device to a weight. Assuming the release was removed, the weight would be common ball weight having little or no stability. Ball weights must have at least a fin to prevent them from spinning as they are pulled through the water. Also a ball weighing 8–20 pounds is very difficult to handle as there are no provisions to securely grip the object.

Trolling weights may be found in the Spring, 1995 mail order catalogs i.e., Offshore Angler pg. 115, Cabela's pg. 249 and the Scotty 1994 fishing equipment catalog pg. 15. These weights are basic ball types with a fin. One shown in the Offshore Angler catalog is referred to as a pancake weight. Pancake weights are constructed using a large flat fin and a round convex lead disc on each side. Although this type of weight has minimal drag it's position under the water is not always known and can oscillate back and forth causing lines to foul.

OBJECTS AND ADVANTAGES

Accordingly, several objects and advantages of my invention are:

(a) to provide a trolling weight that has a handle as an integral part of it's embodiment;

(b) to provide a trolling weight that can be easily carried, or handled with reasonable safety;

(c) to provide a trolling weight that can be effectively trolled at depths greater than 600 feet;

(d) to provide a trolling weight constructed of materials that are viewed to be environmentally safe when used in fisheries;

(e) to provide a trolling weight that is stable and tracks in a straight line when trolled at speeds up to and greater that eight miles per hour;

(f) to provide a trolling weight with an outer surface coating that is highly resistance to abrasions and is acknowledged as being environmentally safe when used in fisheries;

(g) to provide a trolling weight that can be coated with a wide range of colors;

(h) to provide a trolling weight that need not be placed in a containment vessel to prevent uncontrolled rolling when left lying unattended on the boat's deck;

(i) to provide a stable and straight tracking trolling weight that can be produced in sizes ranging from two to sixty pounds;

(h) to provide a trolling weight that can be connected/disconnected easily from a trolling cable;

(j) to provide a trolling weight with a fin that will not bend when dropped; and (k) to provide a trolling weight that is highly resistant to fouling when contacting underwater objects.

Further objects and advantages are to provide a weight which: a) is of a single body design, b) has a large eye for the purpose of easily connecting the weight to a cable, c) accommodates various size lures, baits and line releases, d) will not become fouled with another trolling cable, e) supports the use of several line release on the same trolling cable at the same time, and f) requires no tools to make connections to or from trolling cable. Still additional objects and advantages of the present invention will become apparent hereinafter from the specifications and from the account of the appended claims, particularly when read in conjunction with the accompanying drawings.

Reference Numerals In Drawings

Figure 1:
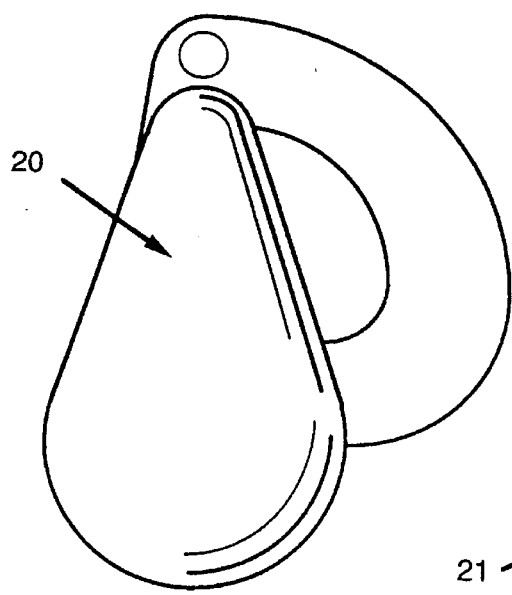
FIG. 1 shows the full embodiment of the present invention.

20 Trolling weight
21 Coating
22 Trolling cable attachment eye
24 Fin
26 Opening forming handle
28 Main body
30 Trolling cable attachment clip
32 Trolling cable
34 Fishing lure
36 Line release
38 Fishing line
40 Boat
41 Downrigger Arm
42 Downrigger
44 Fishing rod

DESCRIPTION

FIGS. 1 to 5

Figure 2:
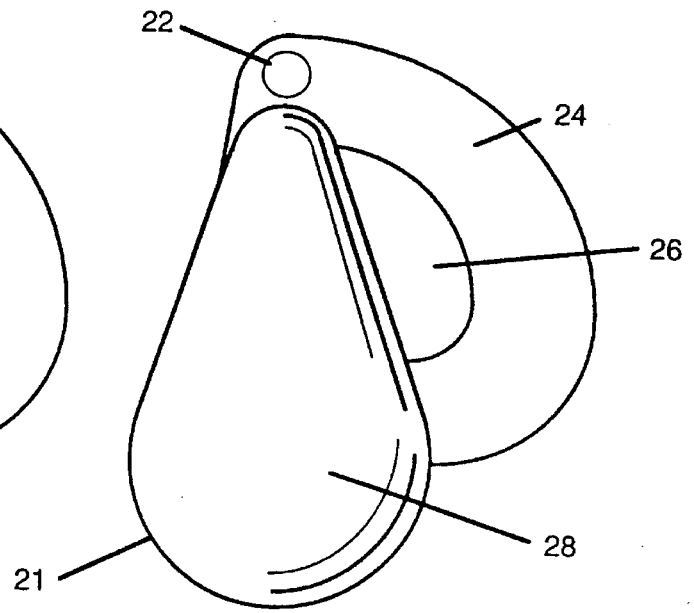
FIG. 2 shows a side view of the embodiment illustrating the five basic parts of the present invention.

A typical embodiment of the present invention is illustrated in FIG. 1 and FIG. 2 shows the four major parts consisting of a trolling cable eye 22, a fin 24, a opening in a section of the fin sufficient to form a handle 26, and the cone shaped main body 28 having generally hemispherical ends, the top hemispherical end being smaller than the bottom hemispherical end. The trolling weight 20 can be constructed of, but not limited to, metal impregnated plastics or metals i.e., brass, aluminum, stainless steel, or iron. The preferred embodiment in FIG. 1, is constructed of cast iron and coated with a weather resistant polyester powder and fired at approximately 400 degrees fahrenheit for bonding. The materials used to produce the present invention were selected in that they are considered to be environmentally safe to use in fisheries.

To better visualize the construction of the present invention, the drawing in FIGS. 2 illustrates the manner in which fin 24 is connected to the small end of main body 28 thereby forming trolling cable attachment eye 22, and curving around one side of main body 28 so as to leave a space between itself and main body 28 thereby form an opening and therefore creating a handle opening 26. The lower section of fin 24 is secured to the apex of the large end of main body 28. However, fin 24 is not limited to any particular point of attachment to main body 28.

Figure 3:
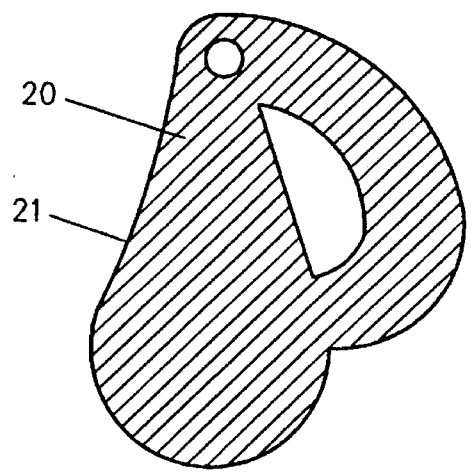
FIG. 3 shows a cross section of the embodiment and an outer coating of the present invention.

In FIG. 2 a hole is shown in the top portion of fin 24 creating trolling cable attachment eye 22 by which trolling weight 20 is connected to trolling cable 32. FIG. 3 is a cross section of trolling weight 20 exposing the core of the embodiment and a surface coating 21 The design of the preferred trolling weight 20 is of a single embodiment thereby reducing total parts and labor, therein decreasing production cost, and whereinthat the present invention's architecture also simplifies manufacturing.

Figure 4:
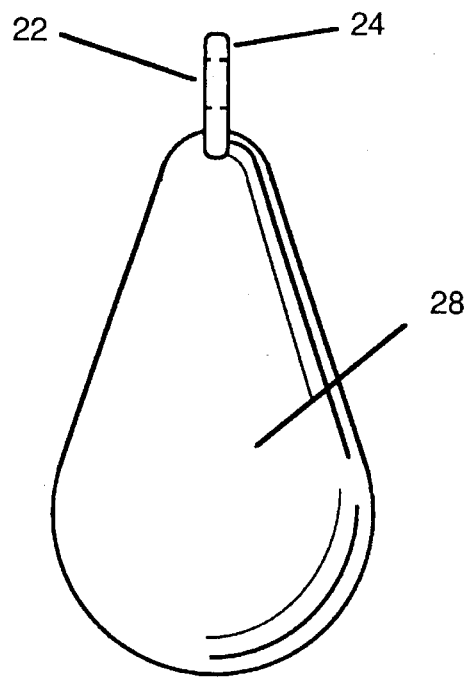
FIG. 4 shows a front view illustrating a main body, the upper most part of a fin and a trolling cable attachment eye.

FIG. 4 is a front view of trolling weight 20 showing the location of fin 24 and trolling cable attachment eye 22 at the top vertical center of main body 28. The bottom of trolling cable attachment eye 22, depending on the size of the weight, ranges from approximately ⅜ inch to ½ inch and is located approximately ⅛ inch above the crown of the small end of main body 28.

Figure 5:
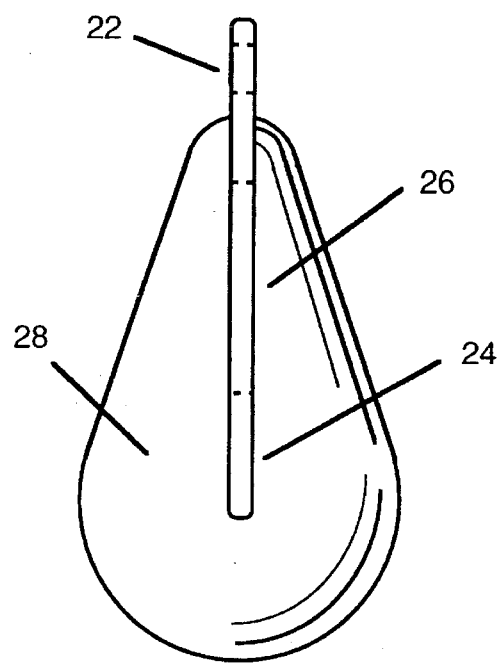
FIG. 5 shows a rear view illustrating main body, fin, trolling cable attachment eye and an opening in fin therein creating a handle.

In FIG. 5 a rear view of main body 28 illustrates the locates of fin 24 at the center line of main body 28 and extending to the approximate center at the widest point of the large cross section of main body 28. Trolling weight 20 will very in dimension depending on the size of weight.

OPERATION

FIGS. 6–8

Figure 6:
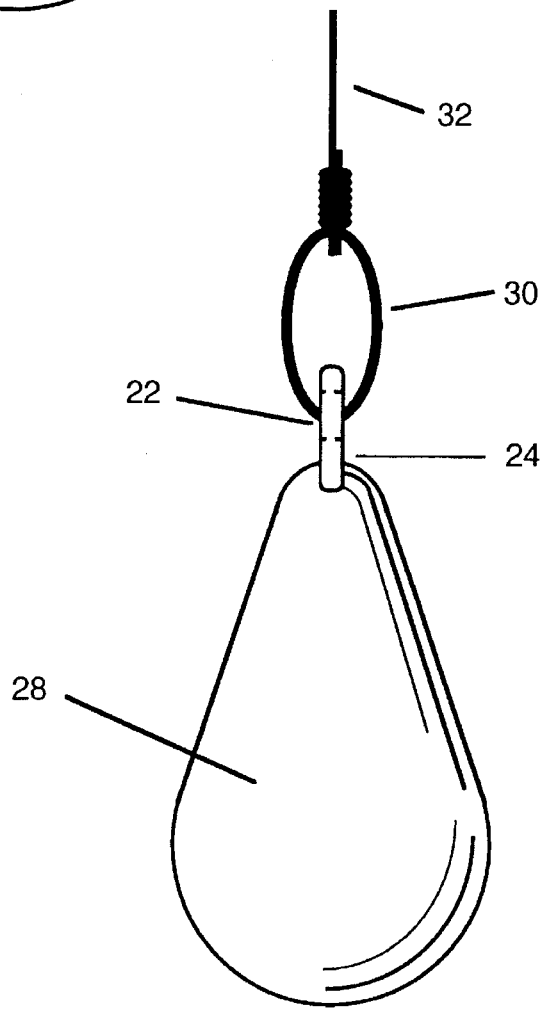
FIG. 6 shows a front view of present invention's main body, trolling cable attachment eye and engagement of a trolling cable attachment clip coupled to a trolling cable.
Figure 7:
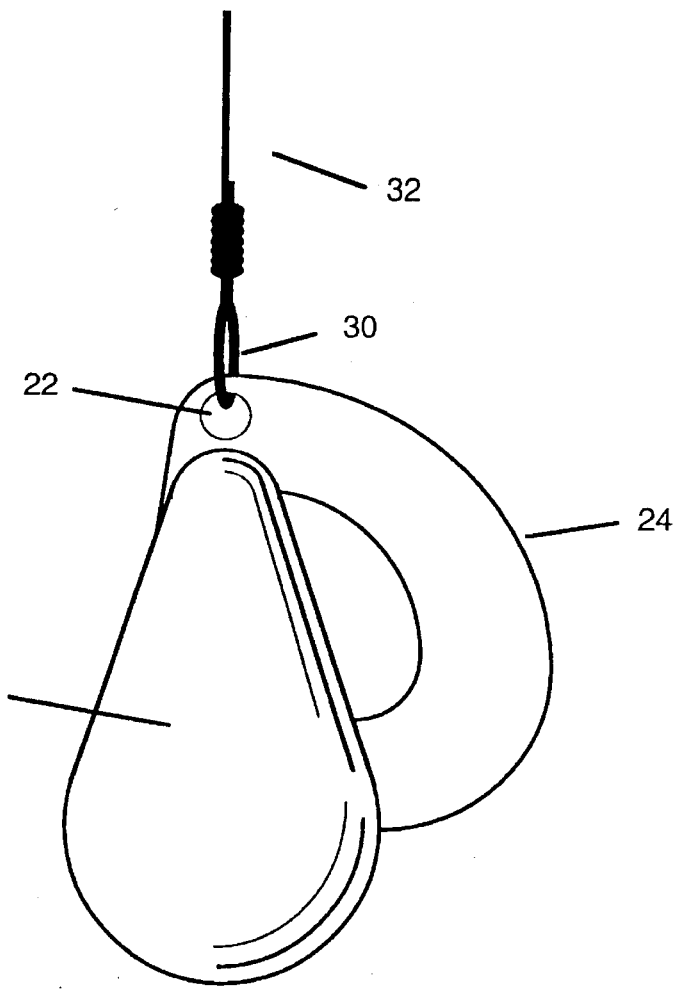
FIG. 7 shows the side view of present invention's main body, fin, handle opening, trolling cable attachment eye and connection to trolling cable attachment clip thereby engaging trolling cable.

FIG. 6 and 7 illustrates a front and a side view respectively of trolling weight 20 as it might be attached to trolling cable 32 using trolling cable attachment clip 30. The attachment of trolling cable 32 should not be limited to the method illustrated herein as methods of connection will very widely.

Figure 8:
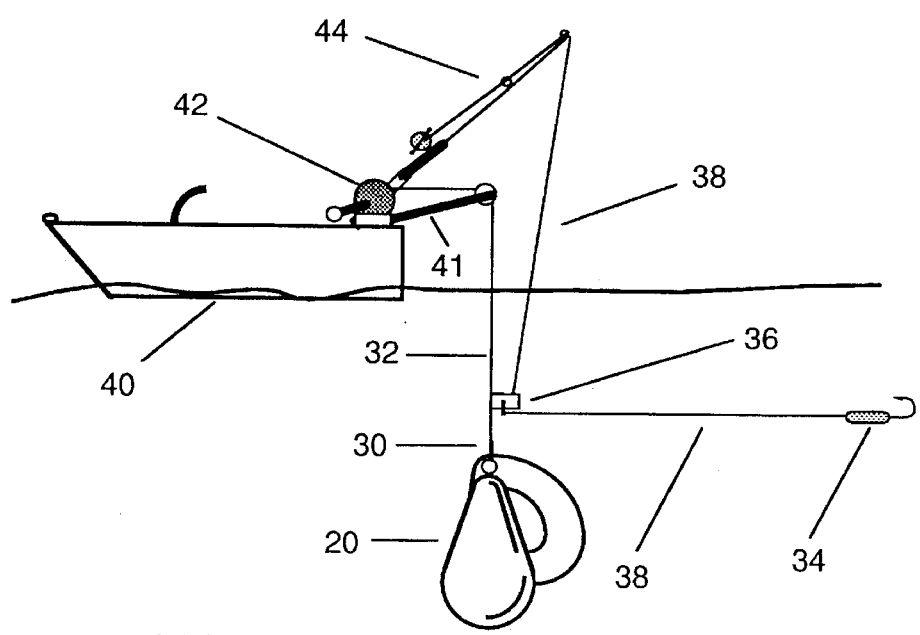
FIG. 8 is an illustration showing the present invention and how it might be used with a conventional downrigger fishing system.

FIG. 8 shows the general operation of the present invention as it relates to the use of a conventional downrigger fishing system. When fishing from a moving boat 40 a downrigger reel 42 containing several hundred feet of steel trolling cable 32 is used to lower the attached trolling weight 28, of which is extended out over the water by a downrigger arm 41 to the desired fishing depth. As boat 40 moves forward in the water, trolling weight 20 holds trolling cable 32 in a near vertical position. At any point along trolling cable 32 one or more fishing line releases 36 can be attached allowing several rods 44 to be fished from a single downrigger system at the same time.

When fishing with downrigger trolling systems it is not uncommon to pull trolling weight 20 within inches of the bottom. When doing so, the more commonly used ball type weight will easily foul underwater objects becoming tangled and break steel trolling cable 32. The downrigger arm 41 may also become bent or broken. Downrigger 42 may even be pulled from its bolted base and lost over the side of boat 40. The present invention's unique cone design having rounded ends greatly reduces underwater fouling thereby reducing equipment damage and loss. Instead of becoming snarled in rocks, trees, bushes and other objects, the small rounded end of the cone allows trolling weight 20 to slide up and out of most entrapments. Wherein the outer abrasion resistant coating 21 on trolling weight 20 reduces damage to trolling weight 20 when underwater contact occurs.

SUMMARY, RAMIFICATION, AND SCOPE

Accordingly, the reader will see that the present invention, when attached to a downrigger fishing system will hold a trolling cable in a near vertical position, track straight and remain stable at speeds up to and in excess of eight miles per hour. Its unique design greatly reduces underwater fouling when contacting underwater objects. Weights weighing four pounds and above have limited form by which to grasp, carry or hold. The absence of a handle, or other methods therein designed for gripping large size weights makes them dangerous to use. Dropping large weights on hands, fingers and feet can result in serious injury.

The primary purpose of designing and producing a weight constructed of materials judged to be environmental safe to use in the fisheries is 1) to eliminate the need to use LEAD for manufacturing trolling weights, 2) to make a trolling weight that is easy to grasp, carry and hold, 3) to reduce underwater fouling and thereby decrease the loss of trolling weights and equipment damage and 4) a weight that remains stable and track straight at all trolling speeds up to and in excess of eight miles per hour.

To accomplish this, the product was designed to be produced cheaply enough to compete with the price of LEAD weights. And also, to reduce the production of LEAD trolling weights in backyard operations which results in even more unseen toxic lead pollution, not to mention the ill effect on the health of those people melting and molding lead in this manner. This weight is made of cast iron with a polyester powder coating which is fired at approximately 400 degrees fahrenheit to produce a hard well bonded outer coating. Both materials are considered environmentally safe for use in fisheries. Because of the nature of these materials, these weights can not be produced in backyards, or make-do-shops, but rather companies that are inspected by environmental inspections agencies. Furthermore, this invention has the additional advantages in that:

it permits the production of trolling weights in a variety of colors;

it permits the production of trolling weights in custom sizes, as required for commercialization;

it permits the production of trolling weights carrying personalized trademarks or logos;

it allows the trolling weight to be produced in sizes ranging from two to sixty pounds.

it allows a full range of trolling weight sizes to be produced of environmental safe materials.

Although the description above contains many specifications, these should not be construed as limiting the scope of the present invention but as merely providing illustrations of some of the presently preferred embodiments of this invention. For example, the trolling weight can have other fin sizes and shapes, cable attachment eye locations and sizes and coatings, etc.; the present invention can be used in partnership with any appropriate device, and can be injection molded from a wide range of metal impregnated thermoplastics, cast from metal impregnated resins or machined/cast from various metals, etc.

Thus the scope of the invention should be determined by the appended claims and their legal equivalents, rather than by the examples given.

We claim:

1. A device for lowering a downrigger trolling cable to desired fishing depths comprising (a) a main body including a top generally hemispherical end portion, a bottom generally hemispherical end portion which is larger than said top generally hemispherical end portion, and a generally cone-shaped portion between the top generally hemispherical end portion and the bottom generally hemispherical end portion, (b) a fin for stabilizing movement of said device when pulled through water, said fin being attached to said top generally hemispherical end portion and to an intermediate portion of said main body whereby said fin curves around said body, (c) a trolling cable attachment eye in said fin above said top generally hemispherical end portion, and (d) an opening between said fin and said generally cone-shaped portion whereby said fin functions as a handle for the device.

2. The invention of claim 1 wherein said device comprises a single piece of cast iron.

3. The invention of claim 2 wherein said device ranges from approximately two to sixty pounds in weight.

4. The invention of claim 2 wherein said device has a coating of abrasion resistant material.

5. The invention of claim 4 wherein said coating is formed from a polyester powder heated to approximately 400 degrees fahrenheit thereby creating a hard scratch resistant surface.

6. The device as defined by claim 1 wherein said fin is attached to said intermediate portion at the widest point of said generally cone-shaped portion and said bottom generally hemispherical end portion.

* * * * *